A. M. CRAIG.
TESTING MACHINE.
APPLICATION FILED APR. 30, 1919.

1,367,353.

Patented Feb. 1, 1921.
3 SHEETS—SHEET 1.

Inventor,
Alvin M. Craig,
By his Attorney,
W. P. Hutchinson.

A. M. CRAIG.
TESTING MACHINE.
APPLICATION FILED APR. 30, 1919.
1,367,353.
Patented Feb. 1, 1921.
3 SHEETS—SHEET 2.
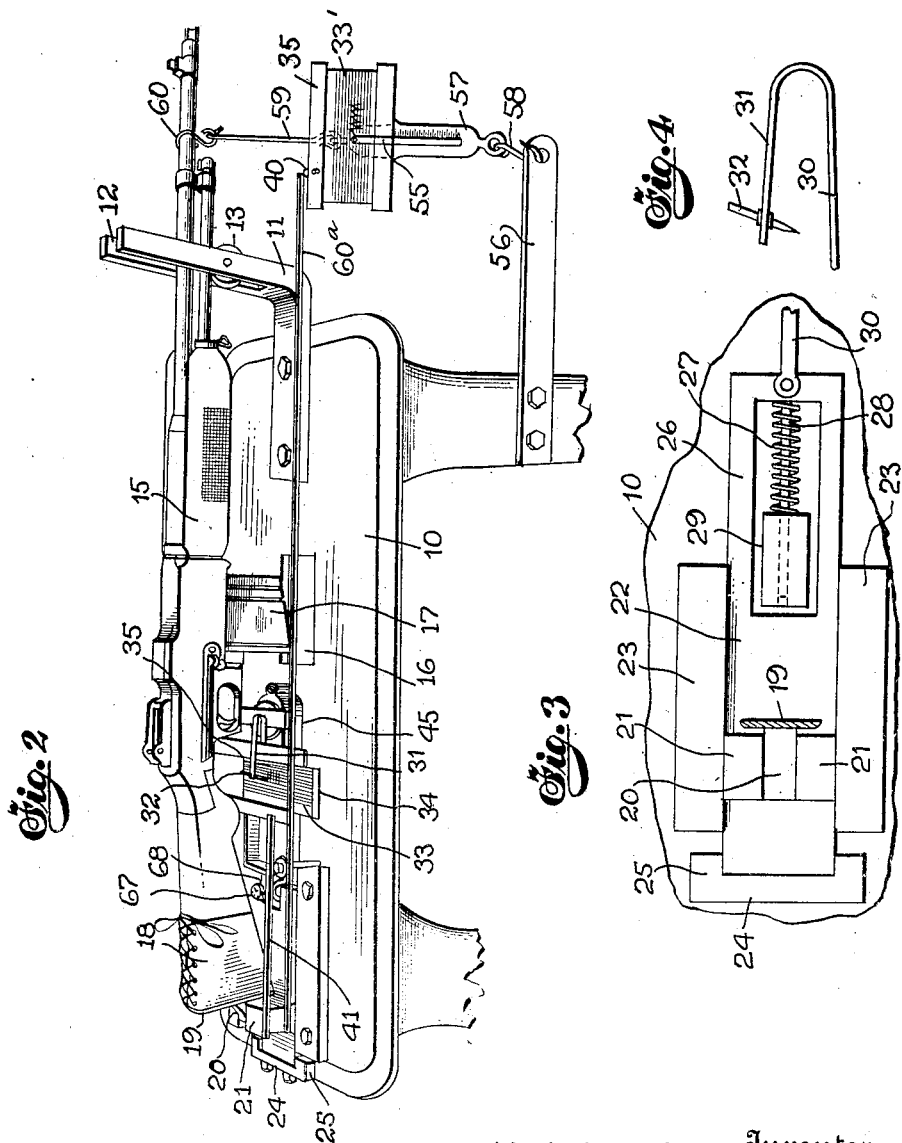
Inventor
Alvin M. Craig,
by his Attorney
W. B. Hutchinson.

A. M. CRAIG.
TESTING MACHINE.
APPLICATION FILED APR. 30, 1919.
1,367,353.
Patented Feb. 1, 1921
3 SHEETS—SHEET 3.
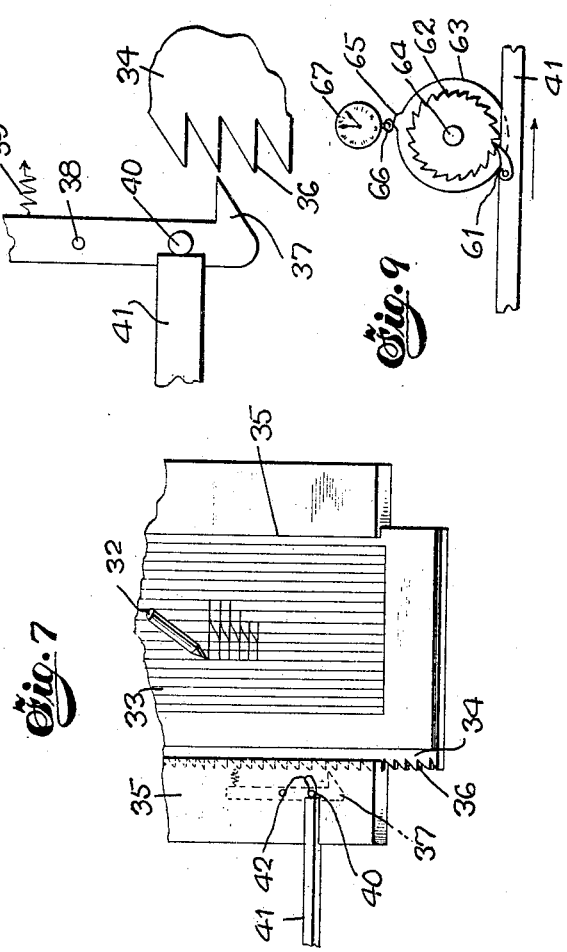
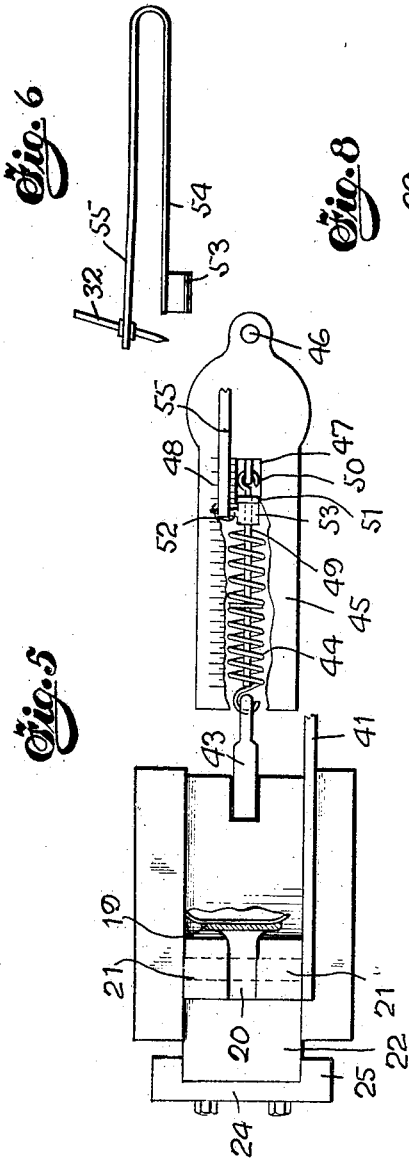
Inventor
Alvin M. Craig,
By his Attorney,
W. B. Hutchinson

UNITED STATES PATENT OFFICE.

ALVIN M. CRAIG, OF NEW HAVEN, CONNECTICUT.

TESTING-MACHINE.

1,367,353.	Specification of Letters Patent.	Patented Feb. 1, 1921.

Application filed April 30, 1919. Serial No. 293,744.

*To all whom it may concern:*

Be it known that I, ALVIN M. CRAIG, a citizen of the United States, and a resident of New Haven, county of New Haven, and State of Connecticut, have invented a new and useful Improvement in Testing - Machines, of which the following is a full, clear, and exact description.

My invention relates to improvements in machines for testing guns and their ammunition so as to indicate accurately the amount of recoil of the gun, the amount of lift at the muzzle, and the quality of the ammunition. My invention is intended to produce a simple mechanism by which an accurate record will be made and kept of the aforesaid conditions. My invention is further intended to produce a simple apparatus to which the gun may be applied, and which will accurately measure in pounds or other degrees the recoil or lift of the gun, and will register every shot fired on a suitable card so that a record can be seen and kept showing the amount of recoil or lift as the case may be, at every shot. In general my invention consists of arranging the gun so that at every shot the recoil will act against a weighing scale, the indicator of which will show pressure after every shot, and to connect with the scale a recording stylus which will move over a card and record the pressure of the recoil on the card. My invention is further intended to produce a simple means for shifting the card after every shot so that the effect of every shot will be properly recorded. This idea can be carried out also in connection with the muzzle of a gun to indicate and record the amount of lift of the muzzle, and it will be seen that the effect of every shot is recorded. This also affords an accurate indicator of the quality of the ammunition because a registering mark is made as each shot is fired, and if the ammunition is relatively strong it will show a greater amount of pressure, which will be indicated on the card or table.

In connection with the foregoing I provide a timing attachment which will start a stop-watch when the firing begins, and stop it when the firing ceases, thus showing accurately just how many shots have been fired in a given time. This indicator can also be made to stop and start so as to indicate the shots during the interval between the starting and stopping. In general, the object of the invention is to produce a simpler and better testing machine than has heretofore been used for measuring the recoil and lift power of a gun, and especially a rifle of the automatic machine type.

Reference is to be had the accompanying drawings forming a part of this specification, in which similar reference characters indicate corresponding parts in all the views.

Fig. 2 is a similar view showing the apparatus adapted to measure the lift at the barrel.

Fig. 3 is a broken plan partly in section showing a form of scale which can be used in connection with the apparatus.

Fig. 4 is a detail of a stylus arm.

Fig. 5 is a broken plan view partly in section showing another form of weighing or scale apparatus.

Fig. 6 is a detail of a slightly modified form of stylus arm.

Fig. 7 is a broken plan view of the card or chart and its connecting parts for guiding and operating it.

Fig. 8 is an enlarged detail view of the mechanism for moving the card or chart slide, and Fig. 9 is a detail of the mechanism for controlling the stop watch.

Figure 1:
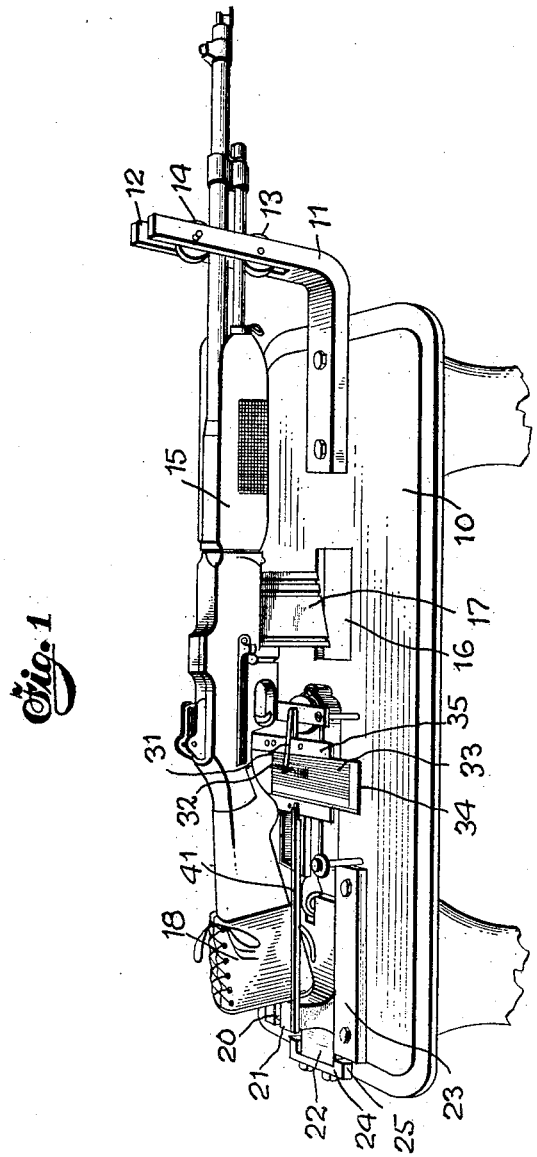
Figure 1 is a broken perspective view of the apparatus embodying my invention, showing a gun in position thereon adapted to measure the recoil.

The apparatus is provided with a suitable frame 10 which can be of any approved design, and is shown as a table, this having thereon preferably near one end a bracket 11 part of which extends upward, is bifurcated as shown at 12, and provided with rollers 13 and 14 between which the barrel of the gun extends, and the upper roller should be removable in any convenient way to provide for measuring the lift of the gun, as will hereinafter appear. The gun 15 is arranged to extend lengthwise of the bed or table, and I have shown the table provided with a slot 16 so that a long magazine 17 can be used in the gun if desired and passed down through said slot.

Suitable means is provided for holding the butt-stock or breech of the gun in place without injuring it, and any suitable means can be used for this purpose. I have found a boot 18 suitable, as this can be laced around the butt of the gun, and it is provided with a butt-piece or base 19 which has a rearward extension 20 pivoted between the blocks or brackets 21 which are attached to a slide plate 22, this having at the rear end a cross piece 24 with abutments 25 thereon which by striking the ways 23 in which the slide plate moves, serve to limit the forward movement of the slide plate and gun.

In Fig. 3 I have shown how the slide plate 22 can connect with a compression spring which acts as a scale, and here the forward end of the plate 22 can be formed into a yoke 26 in which a spring 27 is held, and a rod 28 extends through the spring and slides in the guide block 29. A stylus arm 30 extends forward from the plate, is doubled and returned upon itself as shown at 31, and carries a stylus 32 which moves across a graduated scale or card 33 which can be marked to indicate pounds or other degrees of measurement, and this is attached to a plate 34 which moves transversely in ways 35, and is moved after each shot as will be presently explained. This card and its supporting plate can be moved in any convenient way, but I have shown in Figs. 7 and 8 a suitable means in which case the plate 34 is provided with teeth 36 on one edge which are engaged by the toothed end of a pawl 37 which is pivoted at 38 and held forward out of engagement with the rack or teeth 36 by the spring 39. On the pawl is an abutment 40 against which the end of the arm 41 strikes, and this arm extends backward parallel with the gun and is attached to one of the brackets 21 so that when the gun is fired and moves back by reason of the recoil, it will press back the plate 22 against the tension of the spring 27, and the stylus 32 will indicate the extent of the movement on a card 33. On the reverse movement the arm 41 pushes the pawl 37 into engagement with one of the teeth 36 and moves the plate 34 and card 33 a distance of one tooth so that the next movement of the stylus with the recoil of the gun will be indicated on the card. In Fig. 1 the scale for measuring the recoil has an extension spring of the kind shown in Fig. 5 instead of a compression spring, but the principle is exactly the same. Here the plate 22 connects by means of the link 43 with an extension spring 44 which is held in the casing 45, and this is pivoted to the frame of the machine as shown at 46. The casing is slotted as shown at 47 and has the usual grade marks 48 alongside the slot. A rod 49 extends through the spring 44, and the rod is hooked as shown at 50 to a convenient staple in the casing as in ordinary spring weighing scales. A collar 51 attached to the spring slides on the rod 49 and carries with it a sleeve 53 having an indicating hand 52 thereon. The sleeve 53 connects with the stylus arm 54 which is doubled and returned on itself as shown at 55 and carries the stylus 32 which moves over the card 33. These two examples of the weighing scale serve to show that any suitable weighing scale can be used to receive the recoil of the gun and actually weigh the amount of said recoil. In practice the card is given an arbitrary zero, and the construction lends itself to this arrangement, that is to say the spring of the scale is compressed so that if zero is indicated on the chart there will be really a compression of thirty or forty or whatever number of pounds is desired. Otherwise if the apparatus were used with a gun firing several hundred shots per minute, the movement against an uncompressed scale would be so large that mechanical difficulties would prevent the apparatus from working accurately. In other words the scale unless its spring were previously compressed, could not move fast enough to keep up with the shot movements, and the reading on the chart would therefore be incorrect.

The same principle of measuring the recoil can be used for measuring the lift of the muzzle as illustrated in Fig. 2. To provide for this the frame of the machine has a forwardly extending arm 56 which comes below the barrel of the gun, and a spring scale 57 of any usual kind, or as shown in Fig. 5, is hooked as shown at 58 to the arm 56, while the upper end of the scale connects by the link 59 and hook 60 with the barrel of the gun. When thus used the upper roller 14 is removed from the bracket 11, and the card holder 35 for carrying the card $33^1$ is supported on the scale, while the stylus arm 55 is arranged as already shown, and the stylus traverses over the card $33^1$ which in this case is arranged vertically instead of horizontally. The mechanism for stepping the card and working the stylus is not shown in this view because it is exactly as already shown and described. To provide for measuring the lift and working the card apparatus, a second arm $60^a$ similar to the arm 41 already referred to, extends forward from one of the brackets 21 or from some suitable part of the slide plate 22, and operates against the abutment 40 for moving the pawl of the card stepping device as already described. It will thus be seen that as the recoil serves to operate the device for measuring the muzzle lift, the indicating devices for recording the recoil and muzzle lift can be worked separately or together as desired. The recoil apparatus will therefore operate, but without doing any recording on the recoil card 33, while the stylus on the card $33^1$ of the lifting part will operate as described, that is to say, when a shot is fired and the muzzle lifts, the amount of lift will be measured on the scale 57 and recorded on the card $33^1$, the recoil of the gun carrying the latter backward slightly meanwhile, and on the return movement of the gun the arm 60ᵃ will actuate the card 33 to step it forward a notch as already described.

In Fig. 9 I have shown means for starting and stopping the stop-watch so that the time required to fire a certain number of shots can be determined readily, while the recoil or lift are being measured. The rod 41, or it might as well be the rod 60, is provided with a pawl 61 which engages a ratchet wheel 62 carrying a cam plate 63 which is pivoted as shown at 64, and the plate 63 has a cam 65 thereon which strikes the starting and stopping stem 66 of a stop-watch 67. This device can be arranged at any suitable place on the bed of the machine as shown in Fig. 2. When the cam 65 strikes the stem 66, it starts a stop-watch, and when it strikes it again, it stops it. It will be seen that every time a shot is fired the rod 41 will be actuated and the ratchet wheel 62 stepped around one tooth, and consequently the number of shots fired will be recorded on the card 33, and the time required for firing the shots will be indicated on the stop-watch. This can also be computed by the number of teeth on the ratchet wheel 62, as there are as many teeth as there are shots fired during the interval. The illustration in Fig. 9 is by way of example, and obviously there could be as many teeth 62 as desired on the ratchet wheel or more cams 65 could be used. The cam should, however, occupy no more space than the width of a tooth, so that it will stop and start the watch smoothly. In practice the shots are generally fired from a belt, and the rate of fire can easily be computed from the timing device. In the present instance there are twenty teeth on the ratchet wheel, and assuming the cam 65 to be in the position shown in Fig. 9, and the device ready to start, the watch would be started at the first shot, and would stop when twenty shots had been fired, or when the cam had made a complete rotation. The exact time required to fire twenty shots would be indicated, but obviously the cam could be made to rotate once at a firing of fifty shots or one hundred shots, or whatever number seemed desirable. Obviously other means can be used for stopping and starting the watch by the action of the gun in its recoil or lifting movements.

From the foregoing description it will be seen that I have illustrated and described a very simple and accurate means of measuring and recording the recoil or muzzle lift of a gun after every shot is fired, and it will be further seen that many of the details of construction can be departed from without affecting the principle of the invention.

It will be seen that the term "recoil" covers the movement of the gun whether directly back or vertically as it is all movement from the explosive charge, and the principle of this invention is the same whether measuring the horizontal or the vertical movement.

I claim:—

1. An apparatus of the kind described comprising a weighing scale, means for supporting a gun so that its recoil shall act upon the weighing scale, a recording chart, a stylus movable on said chart, the chart and stylus moving alternately, and means actuated by the movement of the gun for moving both chart and stylus.

2. An apparatus of the kind described comprising a weighing scale, means for supporting a gun so that its recoil shall act upon the weighing scale, an intermittently moving recording chart, a stylus movable on said chart, and automatic means for actuating the stylus at each movement of the scale.

3. An apparatus of the kind described comprising a weighing scale, means for supporting a gun so that its recoil shall act upon the weighing scale, a recording chart, a stylus movable on said chart, the stylus and chart having step by step movements with relation to each other, and means for imparting said step by step movements at each recoil of the gun.

4. An apparatus of the kind described comprising a weighing scale, a fastening device to secure the butt of a gun, an operative connection between the fastening device and the weighing scale, means for guiding the gun barrel, and a recording device to register the successive movements of the gun and scale, said recording device comprising a stylus, a chart over which the stylus moves, and means actuated by the movement of the gun and scale to give to the stylus and chart step by step movements.

5. An apparatus of the kind described comprising a weighing scale, a fastening device to secure the gun with its butt acting against the scale, means for guiding the gun, and a recording device to record the successive movements of the gun and scale, said recording device comprising a chart having an intermittent movement transversely of the movement of its stylus, and a stylus acting on the chart, the chart and stylus moving alternately, and means for moving the chart and stylus by the movement of the scale and gun.

6. An apparatus of the kind described comprising a weighing scale, means for supporting a gun so that its recoil shall act upon the weighing scale, a recording chart, a stylus movable on said chart, means for automatically actuating the stylus at each movement of the scale, and automatic means operated by the movement of the gun for stepping the chart to a new position at each scale movement.

7. An apparatus of the kind described comprising a weighing scale, means for supporting a gun so that its recoil shall act upon the weighing scale, a recording chart or card, a stylus acting on said card, automatic means for moving the stylus at each recoil of the gun, and a pawl and ratchet mechanism actuated at each recoil of the gun to shift the position of the aforesaid chart or card.

8. An apparatus of the kind described comprising a weighing scale, means for supporting a gun in a position generally parallel with the weighing scale, a slide plate adapted to connect with the butt of the gun and connected also to the scale, an indicating device operatively connected with the scale and a record making device operated by the movements of the gun to record the successive movements.

9. An apparatus of the kind described comprising a weighing scale, means for supporting a gun in position generally parallel with the scale, an operative connection between the gun and the scale whereby the movement of the gun will be indicated on the scale, and an indicating and recording device moving in unison with the gun and scale and indicating and recording the successive gun movements.

10. An apparatus of the kind described comprising a weighing scale, means for supporting a gun generally parallel with the weighing scale and permitting a sliding movement of the gun, a slide plate connected with the scale and adapted to connect with the butt of a gun, a recording chart, a stylus operating in unison with the scale and upon the chart, and a pawl and ratchet mechanism operatively connected with the slide plate and arranged to shift the chart at each movement of the slide plate and scale.

11. An apparatus of the kind described comprising a weighing scale, means for supporting a gun in generally parallel relation to the weighing scale, a guide for the gun barrel, a slide plate connected with the scale, a boot to secure the butt of the gun, said butt connecting with the slide plate, and a record making device operatively connected with the slide plate.

12. An apparatus of the kind described comprising means for supporting a gun in horizontal position, a weighing scale vertically arranged and adapted to connect with the barrel of the gun to measure the vertical recoil thereof, and an indicating chart operatively connected with the weighing scale whereby the scale variations will be indicated on the chart.

13. An apparatus of the kind described comprising means for supporting a gun in horizontal position, a vertically arranged weighing scale having a detachable connection with the gun barrel, and disposed to measure the vertical recoil thereof, an indicating device operated from the weighing scale, and means operated by the recoil of the gun for shifting the position of the indicating chart at each discharge of the gun.

14. In an apparatus of the kind described, means for supporting a gun in firing position and to permit its movement when discharged, a stop-watch, a movable member to engage the stem of the watch to stop and start it, and means for actuating said movable member by the successive movements of the gun when discharged.

15. In an apparatus such as described, means for supporting a gun in firing position, means for supporting a stop watch adjacent to the gun, a rotary member arranged to engage the stem of the watch to stop and start it, and a pawl and ratchet mechanism actuated by the successive movements of the gun when discharged to actuate the said rotary member.

16. An apparatus of the kind described comprising a weighing scale, means for supporting a gun so that its recoil will act upon the scale, an automatic timing device stopped and started by the movements of the gun, and means for recording the movements of the gun during the period represented by the stopping and starting of the timing device.

ALVIN M. CRAIG.

Witnesses:
WARREN B. HUTCHINSON,
M. G. O'DONNELL.